March 9, 1943.  W. S. PARR ET AL  2,313,087
LIQUID COOLING DEVICE
Filed Sept. 11, 1940
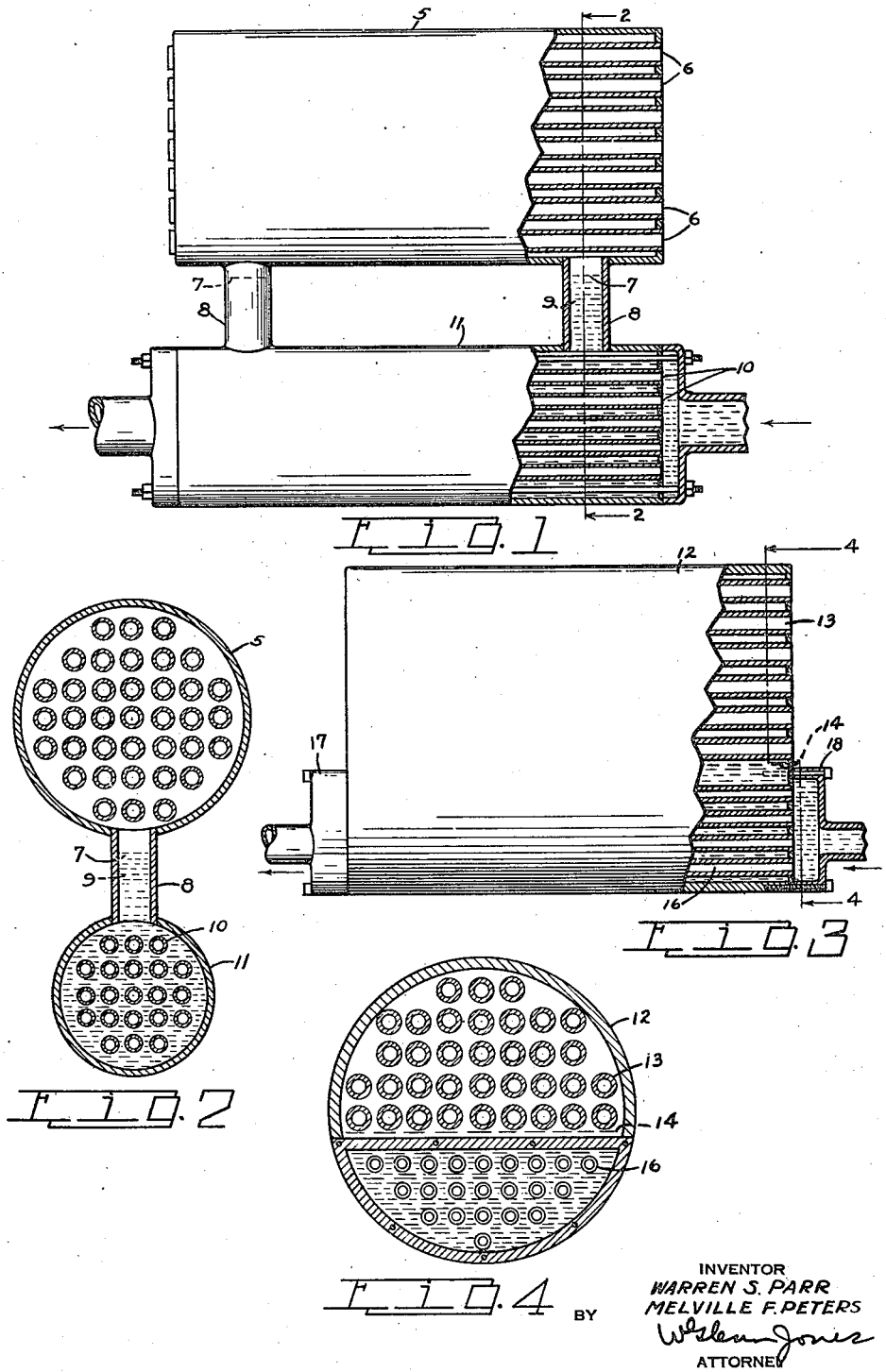
INVENTOR
WARREN S. PARR
MELVILLE F. PETERS
BY
ATTORNEY Patented Mar. 9, 1943

2,313,087

UNITED STATES PATENT OFFICE 2,313,087

LIQUID COOLING DEVICE

Warren S. Parr, United States Navy, and Melville F. Peters, Beltsville, Md.

Application September 11, 1940, Serial No. 356,328

8 Claims. (Cl. 257—1)

(Granted under the act of March 3, 1883, as amended April 30, 1928; 370 O. G. 757)

This invention relates to a method and means for the cooling of fluids by the use of air as a cooling agent.

In cooling liquids it is customary to blow air through metal tubes which are surrounded by the liquid. A well known example of this is the automobile radiator where alcohol or a similar substance must be used when the cooling air is below the freezing temperature of water. Oil coolers are another example. Here the oil congeals when the temperature of the cooling air becomes sufficiently low. Congealing of the oil around the tubes interferes with the cooling, because of the low conductivity of the oil film. If the temperature of the air is low and the rate of flow of the oil slow, the oil may congeal throughout the cooler. Cooling liquid fuels in the above manner will cause stoppage of the fuel line if the liquid is cooled to a sufficiently low temperature to cause the included water to freeze out of the liquid.

It is an object of this invention to provide a method and means for cooling fluids by air which will efficiently perform the cooling function at all portions of a desired range of air temperatures.

It is a further object of this invention to provide a method and means for cooling fluids by air which will cause the cooling effect to vary inversely with the temperature of the fluid throughout a predetermined range of fluid temperature.

It is another object of this invention to provide a method and means for the cooling of fluids by air which will avoid the necessity for the addition of low freezing constituents to a fluid to be cooled at low air temperatures.

With these objects in mind a clear understanding of the invention may be had by a careful consideration of the following specification when considered together with the accompanying drawing, in which:

Fig. 1 is a side elevational view in cross-section of one embodiment of the invention;

Fig. 2 is an elevational view in cross-section of the device shown in Fig. 1, taken along the line 2—2 of Fig. 1;

Fig. 3 is a side elevational view in cross-section of a second embodiment of the invention; and Fig. 4 is an end elevational view, partly in cross-section, of the device shown in Fig. 3, taken along line 4—4 of Fig. 3.

In the embodiment shown in Figs. 1 and 2, the chamber 5 consists of a number of cooling tubes 6 through which the cooling air passes. Attached to chamber 5 is a second cooling chamber 11 through which the fluid to be cooled passes through tubes 10. The two chambers are connected by two tubes 8. A suitable liquid 9 is sealed in the apparatus to some level which is indicated by 7, and which may be higher or lower than shown in the drawing.

The operation is as follows:

The warm fluid flowing through the tubes 10 will heat the liquid 9 which will evaporate and rise into the chamber 5. The cooling air flowing through the tubes 6 will condense the vapor and the resulting cool liquid will flow back into chamber 11, thus cooling the fluid passing through tubes 10. If the temperature of the fluid is high, the rate of evaporation will be great and the quantity of vapor condensed in 5 will be great. This will cause a rapid rate of transfer of heat from the fluid to the cooling air. If the temperature of the fluid is low, the rate of evaporation is low, so that the rate of heat transfer from the fluid to the cooling air is low, and little cooling of the fluid occurs.

In practice a small amount of air will be retained in the chamber as a means of controlling the boiling point of the cooling liquid. As an example, ethyl ether may be selected as the cooling liquid. The absolute pressure of the saturated vapor in pounds per square inch over the temperature range from 0° to 100° F. follows:

| Temp., °F. | Lb./in.$^2$ |
|---|---|
| 0 | 1.3 |
| 10 | 1.8 |
| 20 | 2.5 |
| 30 | 3.4 |
| 40 | 4.4 |
| 50 | 5.5 |
| 70 | 8.8 |
| 80 | 10.9 |
| 90 | 13.4 |
| 100 | 16.0 |

Let it be desired to cool the fluid rapidly for temperatures above 40° F. and slowly below 40° F. The chamber is partially evacuated of air until the air pressure above the liquid is 4.4 lb./in.$^2$ at 40° F. For temperatures below 40° F. the liquid will now evaporate and condense in the chamber 5. If the temperature of the fluid is considerably below 40° F. the rate of evaporation of the liquid will be slow and the rate of cooling of the fluid will be low. As the temperature increases to 40° F. the rate of evaporation increases and consequently the rate of cooling increases. At 40° F. the liquid boils and if the fluid is much above 40° F. the rate of boiling will be violent, so that the liquid will be splashed or thrown from chamber 11 to 5, cooled and returned to 11. This rapid movement of the liquid between tubes 6 and 10 is conducive to rapid cooling. Since the cooling liquid is selected so that it will not congeal or freeze within the temperatures of the cooling air, the rate of cooling is not impaired over a wide range of air temperatures.

Figs. 3 and 4 illustrate a second embodiment of the invention. In this embodiment a single cylindrical tank 12 is provided, the tank being supplied with a large number of tubes running parallel with its longitudinal axis. The ends of all the tubes are open to the exterior of the tank. A pair of fittings 17 and 18 house the ends of a lower group of tubes 16 and connect them with inlet and outlet pipes for conveying the fluid to be cooled therethrough. A supply of cooling liquid 9 covers the tubes in this group but not the tubes 13 above it. The liquid level is shown at 14. Through these latter tubes air is passed. The operation of this embodiment is the same as that of the first embodiment.

The invention described above provides a method and means for cooling fluids which insures adequate cooling over a wide range of temperatures, and a cooling effect which varies inversely as the temperature and tends to stabilize the temperature of the cooled fluid at a fixed level.

While only two embodiments of the invention have been illustrated and described, it is to be understood that the invention is not limited thereto but only by the scope and limitations of the appended claims.

The invention herein described and claimed may be manufactured and used by or for the Government of the United States of America for governmental purposes without the payment of any royalties thereon or therefor.

We claim:

1. A method of cooling a fluid which comprises passing said fluid into heat transferring relationship to a cooling liquid, subjecting said liquid to an air pressure equal to its saturated vapor pressure at a predetermined temperature and passing the vapor of said liquid into heat transferring relationship to a body of cooler fluid.

2. A method of cooling a fluid which comprises passing said fluid into heat transferring relationship to a cooling liquid, fixing the boiling point of said liquid at a desired temperature and passing the vapor of said liquid into heat transferring relationship to a body of cooler fluid.

3. A method of cooling a fluid which comprises passing said fluid into heat transferring relationship to a cooling liquid, subjecting said liquid to an air pressure equal to its saturated vapor pressure at a predetermined temperature of said liquid and cooling the vapor of said liquid.

4. A method of cooling a fluid which comprises passing said fluid into heat transferring relationship to a cooling liquid, fixing the boiling point of said liquid at a desired temperature and cooling the vapor of said liquid.

5. Means for cooling a fluid, comprising a container, a cooling liquid partially filling said container, a quantity of gas in said container sufficient to locate the boiling point of said liquid at a desired temperature, means for passing said fluid into heat transferring relationship to said liquid, and means for cooling the vapors of said liquid.

6. Means for cooling a fluid, comprising a container, a plurality of tubes passing through said container and communicating with the exterior thereof, a cooling liquid partially filling said container and immersing a plurality of the lowermost of said tubes, a quantity of gas filling the remainder of said container and being sufficient in amount to locate the boiling point of said liquid at a desired temperature, and means for passing said fluid to be cooled through the tubes immersed by said liquid, the remainder of said tubes having their interiors open to the atmosphere.

7. Means for cooling a fluid comprising a container, a cooling liquid partially filling said container, a quantity of gas in said container, the quantity of said gas being so selected as to exert a pressure on said liquid equal to the vapor pressure of said liquid when said liquid is subjected to a predetermined temperature, means for passing said fluid into heat transferring relationship to said liquid, and means for cooling the vapors of said liquid.

8. A method of cooling a fluid by means of a cooling medium while controlling the cooling effect of said cooling medium on said fluid, which comprises passing said fluid into heat transferring relationship to a cooling liquid, controlling the pressure upon said liquid and thus controlling its boiling point and passing the vapor of said liquid into heat transferring relationship to said cooling medium.

WARREN S. PARR.
MELVILLE F. PETERS.